(12) United States Patent
Kawabata et al.

(10) Patent No.: US 6,542,314 B2
(45) Date of Patent: Apr. 1, 2003

(54) OBJECTIVE LENS FOR OPTICAL RECORDING MEDIA AND OPTICAL PICKUP APPARATUS USING THE SAME

(75) Inventors: Masato Kawabata, Saitama (JP); Toshiaki Katsuma, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 14 days.

(21) Appl. No.: 09/968,873

(22) Filed: Oct. 3, 2001

(65) Prior Publication Data

US 2002/0063972 A1 May 30, 2002

(30) Foreign Application Priority Data

Oct. 10, 2000 (JP) ........................................ 2000-309052

(51) Int. Cl.⁷ ............................. G02B 3/02; G02B 3/10; G02B 13/00; G11B 7/00
(52) U.S. Cl. ...................... 359/719; 359/721; 359/722; 369/112.26
(58) Field of Search ................................. 359/719, 722, 359/721, 724; 369/112.26, 112.13, 112.08

(56) References Cited

U.S. PATENT DOCUMENTS 6,344,935 B1 * 2/2002 Maruyama ................... 359/722

2002/0060857 A1 * 5/2002 Hosoe ......................... 359/719
2002/0105733 A1 * 8/2002 Hendriks et al. ............ 359/719

FOREIGN PATENT DOCUMENTS

JP  10-026726  1/1998

OTHER PUBLICATIONS

Teruji Ose, "Feature: Resolution Limit Overcoming Technique Expected for Practice—Ultra Resolution Optical System," *O plus E*, pp. 66–72, Sep. 1992.

* cited by examiner

*Primary Examiner*—Georgia Epps
*Assistant Examiner*—Tim Thompson
(74) *Attorney, Agent, or Firm*—Snider & Associates; Ronald R. Snider

(57) ABSTRACT

One surface of an objective lens is provided with a zonal part which acts such that the quantity of light having a wavelength of $\lambda_1$ is apparently canceled in the outer peripheral portion of the luminous flux due to an interference effect, whereas the quantity of light having a wavelength of $\lambda_2$ in the outer peripheral part is kept as it is. The zonal part has such a step that light supposed to pass a position corresponding to the zonal part if the zonal part does not exist and light passing a position at which the zonal part is formed if the zonal part exists generate therebetween a phase difference satisfying a predetermined conditional expression. The numerical aperture at a boundary position of the step has a value between two numerical apertures for the respective wavelengths $\lambda_1$ and $\lambda_2$.

5 Claims, 8 Drawing Sheets

EXAMPLE 1

EXAMPLE 1

LIGHT SOURCE ←

EXAMPLE 1
WHEN LENS IS USED FOR DVD

EXAMPLE 1
WHEN LENS IS USED FOR CD-R

FIG.3
EXAMPLE 2
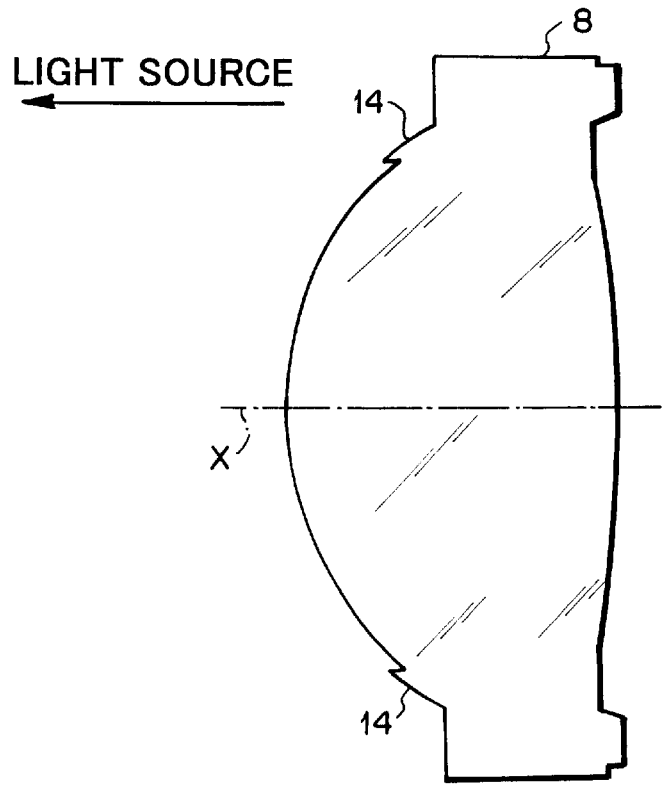
FIG.4A
EXAMPLE 2
WHEN LENS IS USED FOR DVD
FIG.4B
EXAMPLE 2
WHEN LENS IS USED FOR CD-R
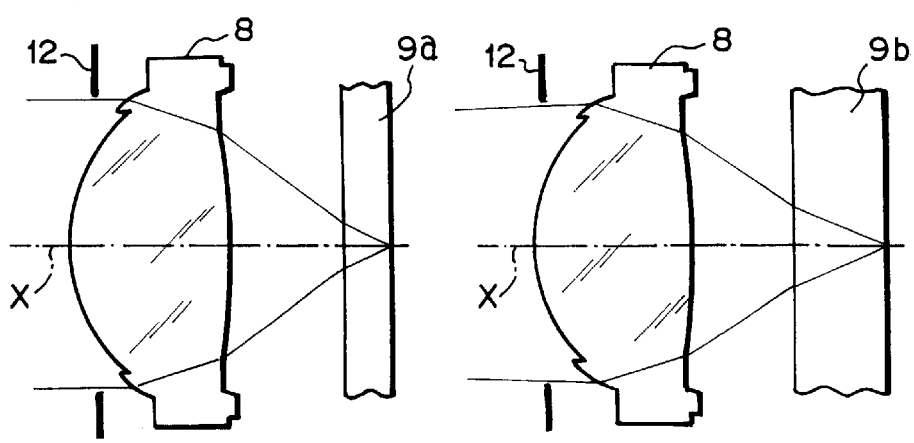

EXAMPLE 1
STOP DIAMETER= φ 3.66mm

WHEN LENS IS USED
FOR DVD(λ =650nm)

EXAMPLE 1
STOP DIAMETER= φ 3.66mm

WHEN LENS IS USED
FOR CD-R(λ =780nm)

EXAMPLE 2
STOP DIAMETER=φ3.66mm
WHEN LENS IS USED
FOR CD-R(λ=780nm)

EXAMPLE 2
STOP DIAMETER=φ3.66mm
WHEN LENS IS USED
FOR DVD(λ=650nm)

WHEN LIGHT AT 650nm IS COLLECTED BY OBJECTIVE LENS OF EXAMPLE 1 (USED FOR DVD)

WHEN LIGHT AT 780nm IS COLLECTED BY OBJECTIVE LENS OF EXAMPLE 1 (USED FOR CD-R)

WHEN LIGHT AT 650nm IS COLLECTED BY OBJECTIVE LENS OF EXAMPLE 2 (USED FOR DVD)

WHEN LIGHT AT 780nm IS COLLECTED BY OBJECTIVE LENS OF EXAMPLE 2 (USED FOR CD-R)

EXAMPLE 1

CONVENTIONAL EXAMPLE

CONVENTIONAL EXAMPLE
WHEN LIGHT IS COLLECTED BY CONVENTIONAL OBJECTIVE LENS WITH NA 0.60

CONVENTIONAL EXAMPLE
WHEN LIGHT IS COLLECTED BY CONVENTIONAL OBJECTIVE LENS WITH NA 0.45

OBJECTIVE LENS FOR OPTICAL RECORDING MEDIA AND OPTICAL PICKUP APPARATUS USING THE SAME

RELATED APPLICATIONS

This application claims the priority of Japanese Patent Application No. 2000-309052 filed on Oct. 10, 2000, which is incorporated herein by reference.

BACKGROUND OF THE INVENTION

1. Field of the Invention

The present invention relates to an objective lens which is usable, when recording or reproducing information, for two optical recording media whose respective numerical apertures and wavelengths of light in use are different from each other, such that the different wavelengths of light in use are efficiently converged at respective desirable positions on their corresponding optical recording media; and an optical pickup apparatus using the same.

2. Description of the Prior Art

In recent years, various kinds of optical recording media have been under development, and optical pickup apparatus which can carry out recording and reproducing while using a plurality of kinds of optical recording media in common have been known. For example, a system which carries out recording and reproducing of DVD (digital versatile disc) and CD-R (recordable optical disc) by using a single optical pickup apparatus has been known.

In such two kinds of optical recording media, for example, visible light at about 650 nm is used for DVD in order to improve the recording density, whereas near-infrared light at about 780 nm is required to be used for CD-R since it has no sensitivity for light in the visible region. An optical pickup apparatus which can be used in common for both of them is based on a dual-wavelength beam type which uses two light beams having wavelengths different from each other as irradiation light.

Also, in the two optical recording media exemplified above, their numerical apertures have to be made different from each other due to their differences in characteristics. For example, numerical apertures of 0.6 and 0.45 have been set for the DVD and CD-R, respectively.

In order to reduce the thickness of a conventional optical pickup apparatus, as shown in FIG. 11, a mirror 51 for reflecting and deflecting the light from a light source is disposed, whereas an aperture stop 52, which is made of a liquid crystal shutter, a filter having a wavelength selectivity, or the like, is interposed between the mirror 51 and an object lens 53, so as to change the numerical aperture according to the difference in kinds of optical recording media 54.

However, the structure of the optical pickup apparatus becomes complicated when the above-mentioned aperture stop is used, which opposes the demand for lowering the cost. In particular, units for recording/reproducing DVD and CD-R used in notebook type personal computers have been required to reduce the thickness of their optical pickup apparatus by decrements of 1/10 millimeters. The thickness reduction in optical pickup apparatus using an aperture stop has already reached its limit.

SUMMARY OF THE INVENTION

In view of the foregoing circumstances, it is an object of the present invention to provide a compact, low-cost objective lens for optical recording media, which can attain respective numerical apertures corresponding to two optical recording media without complicating the structure of the optical pickup apparatus; and an optical pickup apparatus using the same.

For achieving the above-mentioned object, the present invention provides an objective lens for optical recording media, which, when recording or reproducing information for a first optical recording medium corresponding to a first numerical aperture and a first wavelength and a second optical recording medium corresponding to a second numerical aperture and a second wavelength, converges the wavelengths of light in use to respective desirable positions;

wherein one surface of the objective lens is provided with a zonal part which acts so as to apparently cancel the quantity of light having one wavelength $\lambda_1$ in an outer peripheral portion of a luminous flux thereof due to an interference effect but keep the quantity of light having the other wavelength 2 in the outer peripheral portion thereof;

wherein the zonal part has such a step that light supposed to pass a position corresponding to the zonal part if the zonal part does not exist and light passing a position at which the zonal part is formed if the zonal part exists generate therebetween a phase difference satisfying the following conditional expressions (1) and (2):

$$\Delta_{\lambda 1} = (2m+1)\lambda_1/2 + \delta_1 \quad (1)$$

$$\Delta_{\lambda 2} = n\lambda_2 \delta_2 \quad (2)$$

where $\Delta_{\lambda 1}$ is the phase difference at the wavelength $\lambda_1$ between the light supposed to pass the position corresponding to the zonal part if the zonal part does not exist and the light passing the position at which the zonal part is formed if the zonal part exists;

$\Delta_{\lambda 2}$ is the phase difference at the wavelength $\lambda_2$ between the light supposed to pass the position corresponding to the zonal part if the zonal part does not exist and the light passing the position at which the zonal part is formed if the zonal part exists;

m and n are integers;

$|\delta_1| < 0.2\ \lambda_1$; and $|\delta_2| < 0.2\ \lambda_2$; and wherein the numerical aperture at a boundary position of the step has a value between the first and second numerical apertures.

The zonal part may be formed such that the objective lens surface has a center part recessed or protruded with respect to the outer peripheral face thereof.

As a consequence of such a configuration, concerning light having the wavelength $\lambda_1$, the phase difference between the light having passed through the part of objective lens other than the zonal part and the light having passed through the zonal part becomes an odd multiple of ½ wavelength, so that the light having passed through the part other than the zonal part and the light having passed through the zonal part interfere with each other, whereby their quantity of light apparently disappears. (While the fundamental explanation is provided in Teruji Ose, "Feature: Resolution Limit Overcoming Technique Expected for Practice—Ultra Resolution Optical System," O plus E (September 1992), pp. 66–72, it will be explained here in terms of interference of light.)

Concerning light having the wavelength $\lambda_2$, the phase difference between the light having passed through the part other than the zonal part and the light having passed through the zonal part becomes an integral multiple of the wavelength, thereby yielding no apparent phase difference, so that the quantity of light is maintained as it is in the outer peripheral portion of the luminous flux.

For example, in the case where the wavelength $\lambda_1$ used for CD systems such as CD-R is 780 nm, whereas the wavelength $\lambda_2$ used for DVD is 650 nm, the quantity of light apparently disappears in the outer peripheral portion of the luminous flux in the wavelength light used for CD systems but is kept as it is in the wavelength light used for DVD.

In this case, it will be adequate if the step in the zonal part is set, for example, such that a phase difference which is an integral multiple of the wavelength occurs at 650 nm whereas a phase difference which is an odd multiple of the ½ wavelength occurs at 780 nm.

If an optical path difference exists between the light passing through the part other than the zonal part and the light passing through the zonal part, an interference effect will occur therebetween so as to weaken them. When light having a Gaussian amplitude distribution enters the lens, however, it is preferable for the phase differences to be changed rather than being generated at an odd multiple of the ½ wavelength concerning the light having the wavelength B, and at an integral multiple of the wavelength concerning the wavelength $\lambda_2$, in order to cause an interference effect for the light having the wavelength $\lambda_1$ and attain a desirable numerical aperture. The permissible amount of change is up to about 20%.

For example, when the numerical aperture with respect to the wavelength $\lambda_1$ used for CD systems such as CD-R is 0.45 whereas the numerical aperture with respect to the wavelength $\lambda_2$ used for DVD is 0.6, it is considered preferable if the boundary position of the zonal part is located at a position where an area whose numerical aperture NA ranges from 0.45 to 0.6 is divided into two equal parts.

Letting NA be the numerical aperture, and f be the focal length, the area of the lens surface at the numerical aperture NA becomes $\pi(NA\cdot f)^2$. Therefore, letting NAx be the numerical aperture at the boundary position in the zonal part for switching the numerical aperture between 0.6 and 0.45, $$\pi(0.6\times f)^2 - \pi(NAx\times f)^2 = \pi(NAx\times f)^2 - \pi(0.45\times f)^2.$$

Hence, the numerical aperture NAx at the boundary position of the zonal part is:

$$NAx = \{[(0.6)^2 + (0.45)^2]\times(1/2)\}^{1/2}$$
$$\approx 0.53.$$

Namely, since the boundary of the zonal part is provided at a position where the numerical aperture becomes about 0.53, the phase difference between the light having passed through the zonal part and the light having passed through the part other than the zonal part becomes an odd multiple of the ½ wavelength concerning the light having a wavelength of 780 nm, so that they interfere with each other, thereby apparently canceling the quantity of light in the outer peripheral portion of the luminous flux, by which the numerical aperture becomes about 0.45. For the light having a wavelength of 650 nm, there is no apparent phase difference between the light having passed through the zonal part and the light having passed through the part other than the zonal part, whereby the numerical aperture of the object lens is exhibited as it is, so that the numerical aperture becomes 0.6.

Here, in the case where the numerical aperture of the lens is set to 0.45 for CD systems such as CD-R and 0.6 for DVD as mentioned above, for example, the zonal part may be a recessed or protruded zone having an outer boundary position, other than the boundary position with respect to the center part, located on the outer side of a position where the numerical aperture becomes 0.6. i.e., the greater numerical aperture value. Alternatively, the zone may be such that no outer boundary position exists up to the edge face of the lens.

Also, the present invention provides an optical pickup apparatus comprising the objective lens for optical recording media.

Though Japanese Unexamined Patent Publication No. 10-26726 discloses an objective lens whose surface on the light source side is provided with a zonal part, this is an objective lens for an optical pickup to be used with a single-wavelength light source. Also, the objective lens disclosed in this publication is aimed at reducing the large wavefront aberration generated when an optical system for DVD is used for CD systems. Namely, the objective lens disclosed in this publication is not applicable to double-wavelength light sources.

BRIEF DESCRIPTION OF THE DRAWINGS

FIG. 3 is a schematic view showing the objective lens in accordance with Example 2 of the present invention;

FIGS. 4A and 4B are schematic views showing the cases where the objective lens in accordance with Example 2 of the present invention is used for DVD and CD-R, respectively;

DESCRIPTION OF THE PREFERRED EMBODIMENTS

In the following, embodiments of the present invention will be explained with reference to the drawings.

Figure 9:
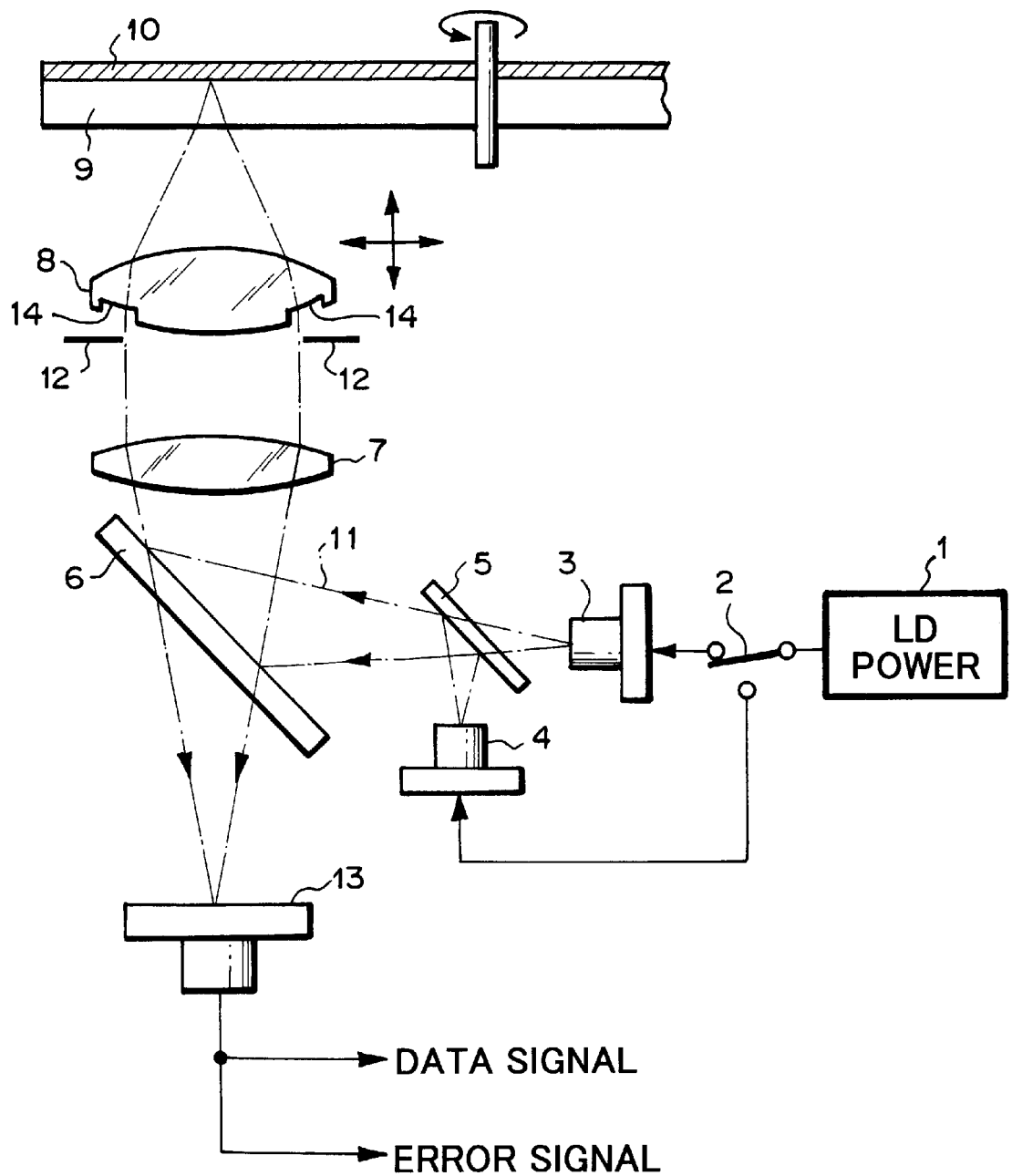
FIG. 9 is a schematic view showing the optical pickup apparatus in accordance with an embodiment of the present invention.

First, an optical pickup apparatus using the objective lens for optical recording media in accordance with the present invention will be explained with reference to FIG. 9.

In this optical pickup apparatus, a semiconductor laser 3, 4 outputs a laser beam 11 when power is supplied thereto from an LD power source 1, a half mirror 6 reflects the laser beam 11, a collimator lens 7 turns thus reflected laser beam 11 into substantially parallel light, and an objective lens 8 converts the parallel light into convergent light, with which a recording region 10 of an optical disc 9 is irradiated. The semiconductor laser 3 is a light source for outputting a laser beam in a near-infrared region having a wavelength of about 780 nm ($\lambda_1$) for CD systems such as CD-R (recordable optical disc), whereas the semiconductor laser 4 is a light source for outputting a laser beam, for example, in a visible region having a wavelength of 650 nm ($\lambda_2$) for DVD (digital versatile disc). The laser beam 11 outputted from one of the semiconductor lasers 3, 4 irradiates the half mirror 6 by way of a prism 5. A changeover switch 2 is disposed between the LD power source 1 and the semiconductor lasers 3, 4. As the changeover switch 2 is operated, power is supplied to one of the semiconductor lasers 3, 4. A stop 12 is disposed on the light source side of the objective lens 8.

In the recording region 10, pits carrying signal information are arranged in a track. The reflected light of laser beam 11 from the recording region 10 is made incident on the half mirror 6 by way of the objective lens 8 and collimator lens 7 while carrying the signal information, and is transmitted through the half mirror 6, so as to be made incident on a four-part photodiode 13. The respective quantities of light received at the four separate diode positions are arithmetically operated in this photodiode 13, whereby data signals and respective error signals for focusing and tracking are obtained.

Since the half mirror 6 is inserted in the optical path of the return light from the optical disc 9 in a state tilted by 45°, it acts like a cylindrical lens, so that the light beam transmitted through the half mirror 6 has an astigmatism, whereby the amount of focusing error is determined according to the form of the beam spot of return light on the four-part photodiode 13. Here, the collimator lens 7 can be omitted depending on the circumstances. Also, a grating may be inserted between the semiconductor lasers 3, 4 and the half mirror 6, such that tracking errors can be detected by use of three beams.

Thus, the optical pickup apparatus in accordance with this embodiment is configured such that signals can be recorded and reproduced for any optical disc 9 of CD-R and DVD.

Here, each of the CD-R and DVD has a protective sheet made of PC (polycarbonate).

Meanwhile, the geometric thickness of CD-R is standardized at 1.2 mm, and one having a refractive index of 1.55 is often used. As for the DVD, on the other hand, one having a geometric thickness of 0.6 mm and a refractive index of 1.58 is often used. Also, these optical discs 9 are used with respective numerical apertures different from each other. In order to secure an appropriate numerical aperture for each of the optical discs 9, a zonal part 14 having a level difference with respect to the center part thereof is formed on the surface of objective lens 8 on the light source side.

The zonal part 14 has such a step that, at a wavelength of 780 nm ($\lambda_1$), light supposed to pass a position corresponding to the zonal part 14 if the zonal part 14 does not exist and light passing a position at which the zonal part 14 is formed if the zonal part 14 exists generate therebetween a phase difference of $(2m+1)\cdot$wavelength/2 (where m is an integer as in the following), so that the light passing through the part other than the zonal part 14 and the light passing through the zonal part 14 interfere with each other in the outer peripheral portion of the luminous flux, thereby apparently canceling the light quantity; whereas, at a wavelength of 650 nm ($\lambda_2$), the apparent phase difference between the light passing through the part other than the zonal part 14 and the light passing though the zonal part 14 is canceled, so that the light quantity is kept as it is in the outer peripheral portion of the luminous flux.

If an optical path difference exists between the light passing through the part other than the zonal part and the light passing through the zonal part, an interference effect will occur therebetween so as to weaken them. When light having a Gaussian amplitude distribution enters the lens, however, it is preferable for the phase differences to be changed slightly rather than being generated at an odd multiple of the ½ wavelength concerning the light having the wavelength $\lambda_1$ and at an integral multiple of the wavelength concerning the wavelength $\lambda_2$, in order to cause an interference effect for the light having the wavelength $\lambda_1$ and attain a desirable numerical aperture. The permissible amount of change is up to about 20%.

For making the respective numerical apertures with respect to wavelengths of 780 nm ($\lambda_1$) and 650 nm ($\lambda_2$) different from each other, the numerical aperture at the boundary position between the center part of the lens surface and the zonal part 14 is set to a value between the respective numerical apertures required for the above-mentioned wavelengths.

For example, letting the respective numerical apertures for light at wavelengths of 780 nm ($\lambda_1$) and 650 nm ($\lambda_2$) to be 0.45 and 0.6, the boundary of the zonal part 14 is placed at a position where the numerical aperture becomes about 0.53, and the outer peripheral side of this position is defined as the zonal part 14. As a consequence, at a wavelength of 780 nm ($\lambda_1$), the light having passed through the zonal part 14 and the light having passed through the part located nearer to the center part than is the zonal part 14 interfere with each other since the phase difference therebetween is an odd multiple of the ½ wavelength, so that the quantity of light in the outer peripheral portion of the luminous flux is apparently canceled, whereby the numerical aperture becomes about 0.45. At a wavelength of 650 nm ($\lambda_2$), by contrast, no apparent phase difference occurs between the light passing through the zonal part 14 and the light passing through the center part, whereby the original numerical aperture (0.6) of the objective lens is exhibited as it is.

When such a zonal part 14 is provided in the case where the DVD is disposed at a predetermined position (on a turntable) for recording/reproducing, the laser beam 11 having a wavelength of 650 nm ($\lambda_2$) from the semiconductor laser 4 is turned into substantially parallel light by the collimator lens 7 and, in this state, made incident on the objective lens 8. Here, without being influenced by whether the zonal part 14 exists or not, the incident laser beam 11 is converged with a numerical aperture of 0.6 onto the recording surface of DVD by the objective lens 8.

In the case where the CD-R (CD system) is disposed at a predetermined position (on the turntable) for recording or reproducing, the laser beam 11 having a wavelength of 780 nm ($\lambda_1$) from the semiconductor laser 3 disposed at a position shifted from the focal position of the collimator lens 7 is made incident on the objective lens 8 while in a slightly diverged state. Here, the luminous flux in the outer peripheral portion of the incident laser beam 11 is apparently canceled by the zonal part 14 due to the interference effect, so that the numerical aperture becomes about 0.45, whereby the laser beam 11 is converged onto the recording surface of CD-R (CD system) by the objective lens 8.

EXAMPLES

The objective lens 8 will now be explained specifically with reference to Examples 1 and 2.

Example 1

Figure 1:
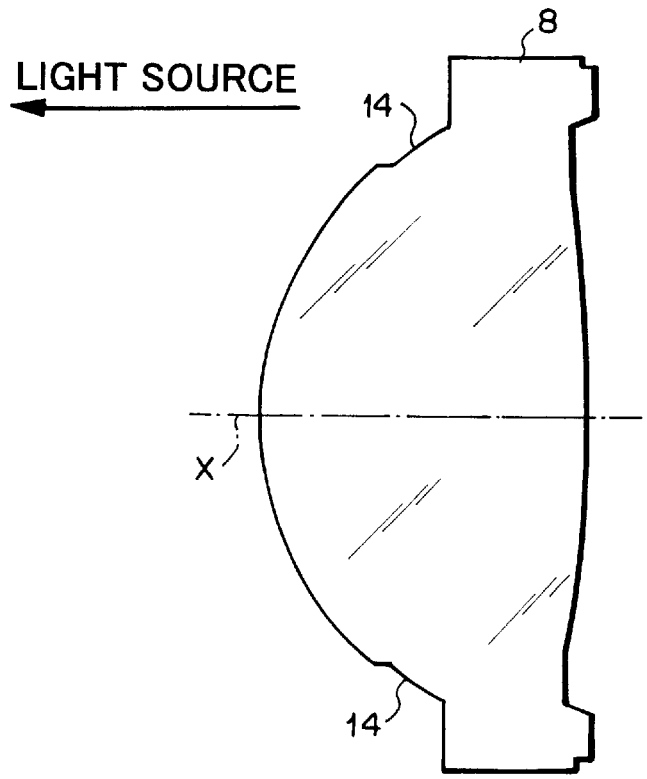
FIG. 1 is a schematic view showing the objective lens in accordance with Example 1 of the present invention.

As shown in FIG. 1, the objective lens 8 in accordance with Example 1 has a recessed zonal part 14 in the outer peripheral portion of its surface on the light source side. In FIG. 1, for convenience of explanation, the step is emphasized. The step is depicted in the same manner in FIGS. 2A to 4B and 9 and 10. In FIG. 1, X indicates the optical axis (as in FIGS. 2A to 4B).

Figure 2A:
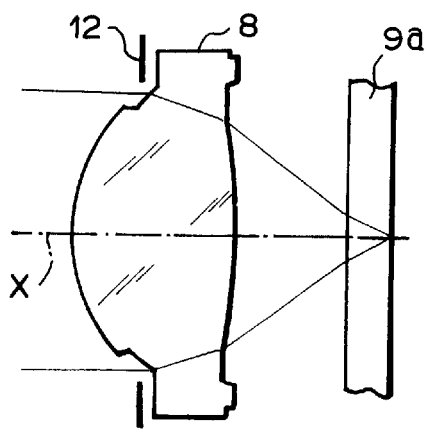
FIGS. 2A and 2B are schematic views showing the cases where the objective lens in accordance with Example 1 of the present invention is used for DVD and CD-R, respectively.

As shown in FIG. 2A, a laser beam having a wavelength of 650 nm ($\lambda_2$) is made incident on the objective lens 8 while in a state turned into substantially parallel light in the case where a DVD 9a is disposed at a predetermined position (on a turntable) for recording or reproducing. Here, the incident laser beam attains a numerical aperture of 0.6 without being influenced by whether the zonal part 14 exists or not, and is converged onto the recording surface of the DVD 9a by the objective lens 8.

Figure 2B:
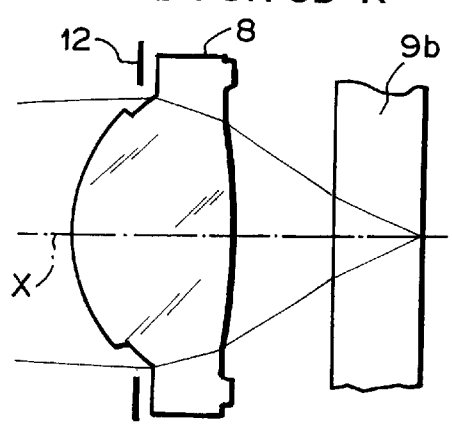
Figure 5A:
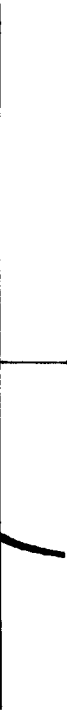
FIGS. 5A and 5B are wavefront aberration charts in the cases where the objective lens in accordance with Example 1 of the present invention is used for DVD and CD-R, respectively.
Figure 5B:
Figure 6B:
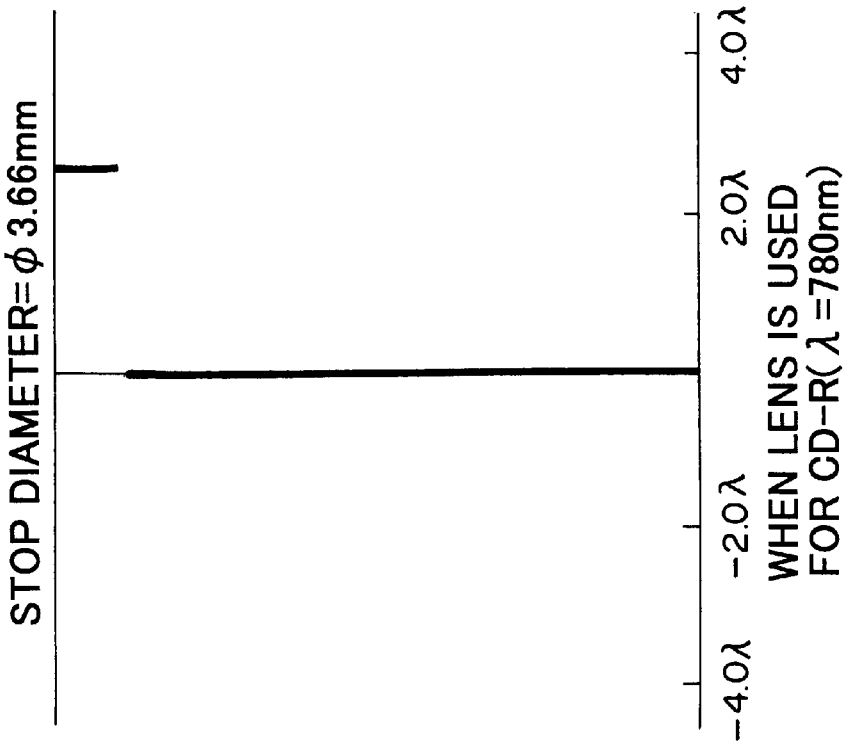
FIGS. 6A and 6B are wavefront aberration charts in the cases where the objective lens in accordance with Example 2 of the present invention is used for DVD and CD-R, respectively.
Figure 6A:
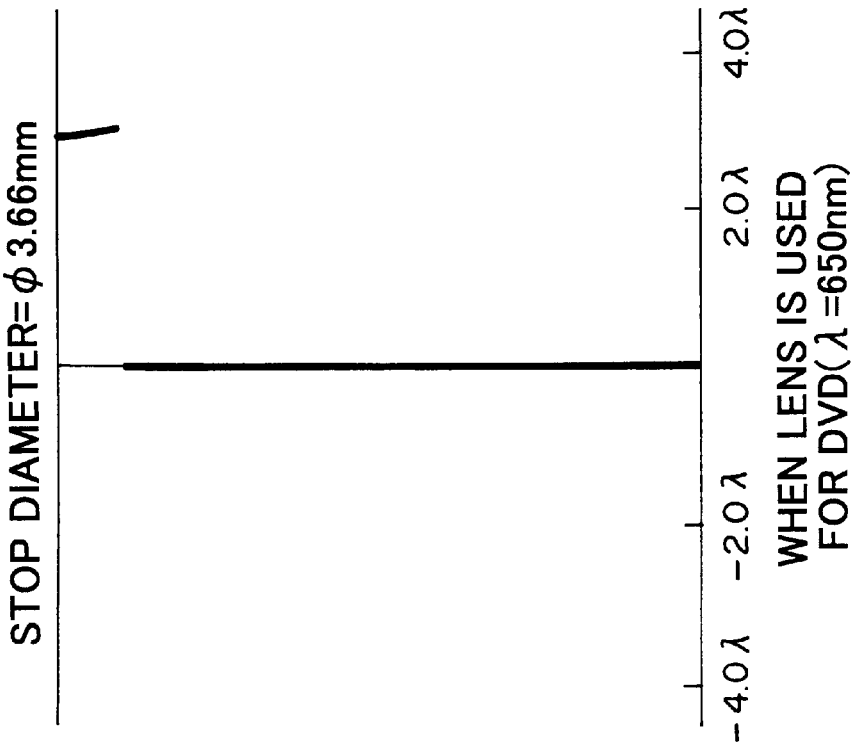
Figure 7A:
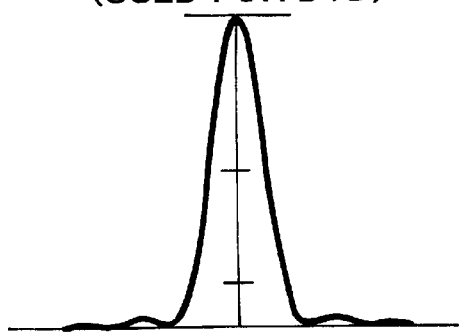
FIGS. 7A and 7B are beam profiles in the cases where light at 650 nm and light at 780 nm are collected by the objective lens in accordance with Example 1 of the present invention, respectively.
Figure 7B:
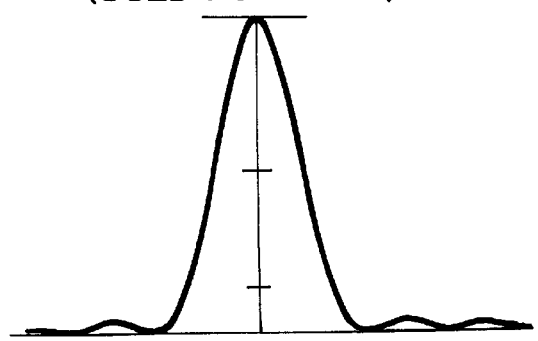
Figure 8A:
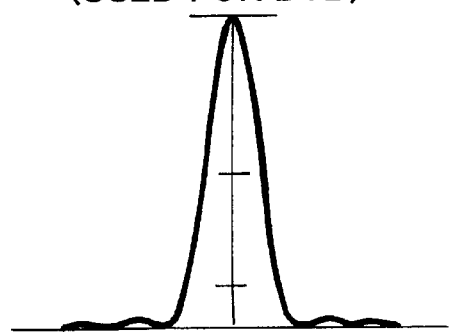
FIGS. 8A and 8B are beam profiles in the cases where light at 650 nm and light at 780 nm are collected by the objective lens in accordance with Example 2 of the present invention, respectively.
Figure 8B:
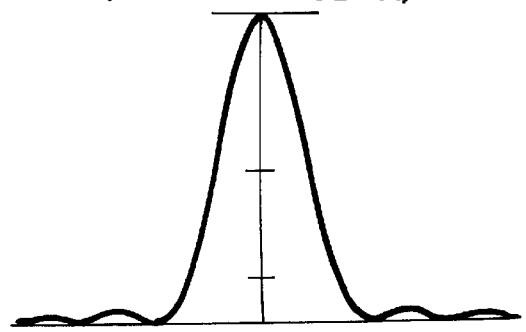

On the other hand, as shown in FIG. 2B, a laser beam having a wavelength of 780 nm ($\lambda_1$) is made incident on the objective lens 8 while in a slightly diverged state in the case where a CD-R 9b is disposed at a predetermined position (on the turntable) for recording or reproducing. Here, the luminous flux in the outer peripheral portion of the incident laser beam is apparently canceled by the zonal part 14 due to the interference effect, so that the numerical aperture becomes about 0.45, whereby the laser beam is converged onto the recording surface of the CD-R 9b by the objective lens 8.

Both faces of the objective lens 8 in accordance with Example 1 are aspheric surfaces represented by the following aspheric surface expression:

$$X(Y) = \frac{Y^2/R}{1+(1-KY^2/R^2)^{1/2}} + \sum_{i=2}^{5} A_i Y^{2i} + B$$

where

X(Y) is the length of the perpendicular to a tangential plane (plane perpendicular to the optical axis) of an apex of the aspheric surface from a point on the aspheric surface having a distance Y from the optical axis;

Y is the distance from the optical axis;

$A_i$ is the aspheric surface coefficient (i=2 to 5 );

R is the radius of curvature of the aspheric surface near the optical axis;

K is the eccentricity; and

B is a constant.

The following Table 1 shows lens data (radius of curvature R, surface spaces D in the cases where $\lambda$=650 nm and 780 nm, and refractive indices N in the cases where $\lambda$=650 nm and 780 nm). The following Table 2 shows the aspheric surface coefficient of each aspheric surface in the objective lens 8 in accordance with Example 1. The following Table 3 shows values of the wavelength in use, disc thickness, and disc refractive index in each of the cases where the DVD and CD-R (CD system) are set as the optical recording medium, and focal length, stop diameter, and light source position of the objective lens 8 in accordance with Example 1.

Example 2

As shown in FIG. 3, the objective lens 8 in accordance with Example 2 has a protruded zonal part 14 in the outer peripheral portion of its surface on the light source side.

As shown in FIG. 4A, a laser beam having a wavelength of 650 nm ($\lambda_2$) is made incident on the objective lens 8 while in a state turned into substantially parallel light in the case where a DVD 9a is disposed at a predetermined position (on a turntable) for recording or reproducing. Here, the incident laser beam attains a numerical aperture of 0.6 without being influenced by whether the zonal part 14 exists or not, and is converged onto the recording surface of the DVD 9a by the objective lens 8.

On the other hand, as shown in FIG. 4B, a laser beam having a wavelength of 780 nm ($\lambda_1$) is made incident on the objective lens 8 while in a slightly diverged state in the case where a CD-R 9b is disposed at a predetermined position (on the turntable) for recording or reproducing. Here, the luminous flux in the outer peripheral portion of the incident laser beam is apparently canceled by the zonal part 14 due to the interference effect, so that the numerical aperture becomes about 0.45, whereby the laser beam is converged onto the recording surface of the CD-R 9b by the objective lens 8.

Both faces of the objective lens 8 in accordance with Example 2 are aspheric surfaces represented by the above-mentioned aspheric surface expression.

The following Table 4 shows lens data (radius of curvature R, surface spaces D in the cases where $\lambda$=650 nm and 780 nm, and refractive indices N in the cases where $\lambda$=650 nm and 780 nm). The following Table 5 shows the aspheric surface coefficient of each aspheric surface in the objective lens 8 in accordance with Example 2. The following Table 6 shows values of the wavelength in use, disc thickness, and disc refractive index in each of the cases where the DVD and CD-R (CD system) are set as the optical recording medium, and focal length, stop diameter, and light source position of the objective lens 8 in accordance with Example 2.

FIGS. 5A and 5B and FIGS. 6A and 6B show wavefront aberration charts of the objective lenses in accordance with the above-mentioned Examples 1 and 2, respectively. As can be seen from these wavefront aberration charts, a predetermined phase difference is generated at the boundary position between the center part of the lens surface and the zonal part 14 thereof in each of the cases where the objective lenses in accordance with the above-mentioned Examples 1 and 2 are used for DVD and CD-R (CD system).

Figure 12A:
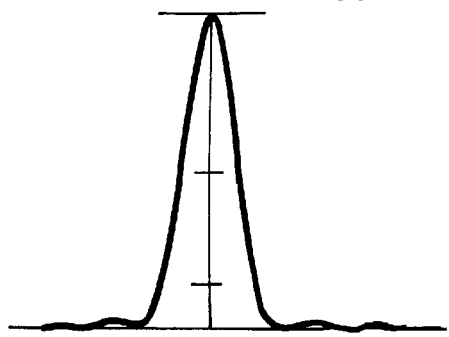
FIGS. 12A and 12B are beam profiles in the cases where light is collected by objective lenses whose numerical apertures are 0.6 and 0.45, respectively.
Figure 12B:
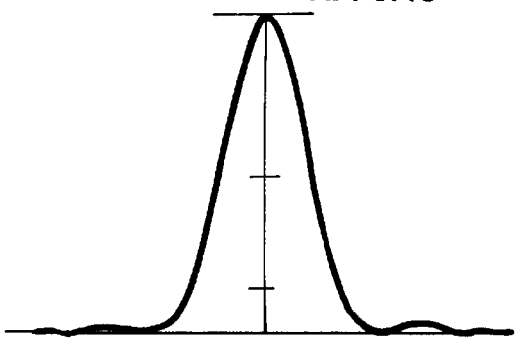

FIGS. 7A and 7B and FIGS. 8A and 8B show beam profiles of light collected by the objective lenses in accordance with the above-mentioned Examples 1 and 2, respectively. FIGS. 12A and 12B show beam profiles of light collected by a conventional objective lens. As can be seen from FIGS. 7A and 7B, 8A and 8B, and 12A and 12B, the objective lenses 8 in accordance with the above-mentioned Examples 1 and 2 have beam profiles substantially the same as those of the conventional objective lens provided with an aperture stop so as to attain an NA of 0.6 or 0.45.

Figure 10:
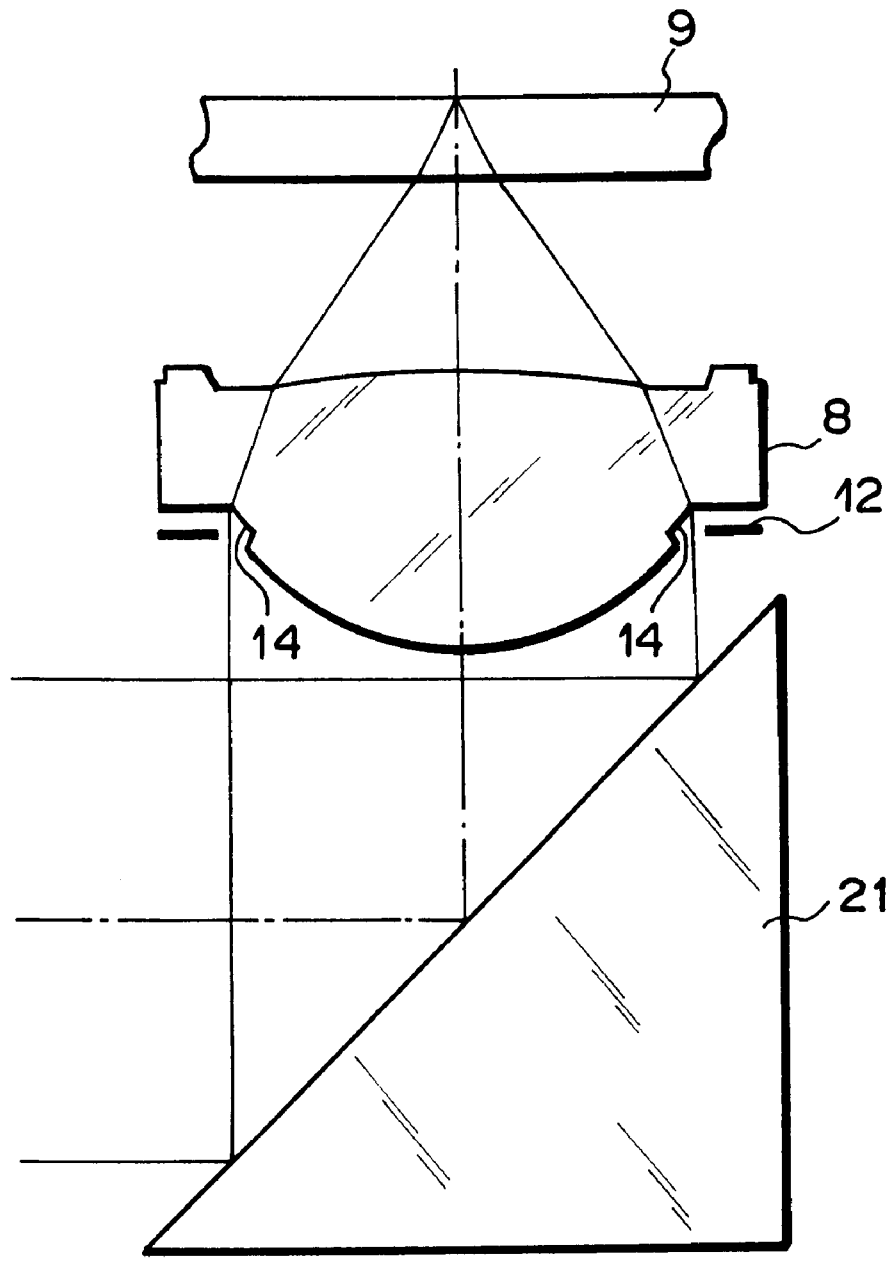
FIG. 10 is a schematic view showing a part of an optical pickup apparatus using the objective lens in accordance with Example 1 of the present invention.
Figure 11:
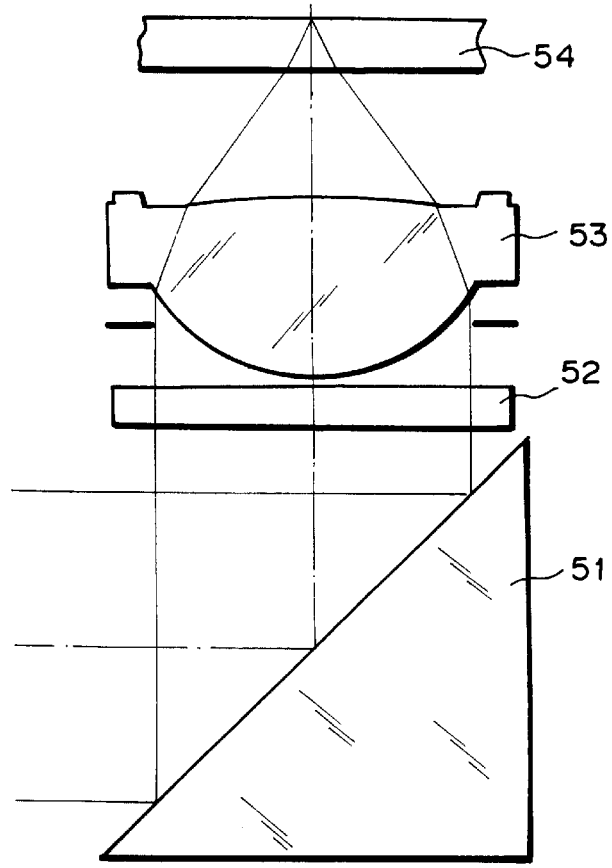
FIG. 11 is a schematic view showing a part of a conventional optical pickup apparatus.

When the objective lens of the above-mentioned Example 1 is used in an optical pickup apparatus, as shown in FIG. 10, it is unnecessary for an aperture stop made of a liquid crystal shutter, a filter having a wavelength selectivity, or the like to be interposed between a mirror 21 for reflecting and deflecting the light in use from the light source and the objective lens 8, whereby the apparatus reduces its size and simplifies its structure. Though not depicted, similar effects can be attained when the objective lens of the above-mentioned Example 2 is used in the optical pickup apparatus.

Without being restricted to the above-mentioned embodiment, the objective lens of the present invention can be modified in various manners. For example, a plastic material can be used as a material for forming the lens.

Though the lens surface on the light source side is provided with a zonal part, the lens surface on the disc side may be provided with a zonal part as well.

Though wavelengths of 650 nm and 780 nm are used in combination, they are not restrictive, whereby other two kinds of wavelengths different from each other may also be used in combination. Similarly, the present invention is applicable to optical systems in which, even at the same disc thickness, wavelengths are different from each other as a condition for use, so that the NA of light has to be changed, for example.

Though the above-mentioned Examples show cases where the light at a wavelength of 650 nm is turned into parallel light whereas light at a wavelength of 780 nm is turned into divergent light, they are not restrictive, whereby the apparent numerical aperture NA can be changed with respect to one of the wavelengths of light.

The optical recording media subjected to recording/reproducing in the optical pickup apparatus of the present invention are not restricted to DVD and CD-R (CD systems). The present invention is applicable to any of cases where two optical recording media whose specs differ from each other in terms of the wavelength in use and numerical aperture are recorded/reproduced by a common optical pickup apparatus.

Though the optical pickup apparatus in accordance with the above-mentioned embodiment is equipped with respective light sources for outputting wavelengths of light different from each other, it may be equipped with a single light source capable of outputting two wavelengths of light different from each other.

In the objective lens in accordance with the present invention and the optical pickup apparatus using the same, as explained in the foregoing, one of surfaces of the objective lens is provided with a zonal part which acts such that the quantity of one wavelength $\lambda_1$ of light in the outer peripheral portion of the luminous flux is apparently canceled by the interference effect whereas the quantity of the other wavelength $\lambda_2$ of light is kept as it is.

Therefore, unlike the conventional objective lens for optical recording media and optical pickup apparatus, it is unnecessary for an aperture stop made of a liquid crystal shutter, a filter having a wavelength selectivity, or the like to be interposed between the mirror for reflecting the light in use from a light source and the objective lens, whereby the optical pickup apparatus can be made thinner and thus is optimal for an apparatus for recording/reproducing DVD and CD-R used in notebook type personal computers in particular.

TABLE 1

| Surface | Radius of curvature (R) | Surface space (D) $\lambda = 650$ nm | Surface space (D) $\lambda = 780$ nm | Refractive index (N) $\lambda = 650$ nm | Refractive index (N) $\lambda = 780$ nm |
|---|---|---|---|---|---|
| 1 | ∞ | −0.9000 | −0.9000 | 1.00000 | 1.00000 |
| 2 | 1.90071 | 2.1500 | 2.1500 | 1.52270 | 1.51921 |
| 3 | −6.04803 | 1.4860 | 1.3004 | 1.00000 | 1.00000 |
| 4 | ∞ | 0.6000 | 1.2000 | 1.58000 | 1.55000 |
| 5 | ∞ | | | | |

The first surface is the stop surface, the second and third surfaces are lens surfaces (both faces being aspheric surfaces), and the fourth and fifth surfaces are disc surfaces.

The surface space and refractive index shown in the k-th surface refer to the surface space and refractive index in the area ranging from the k-th surface to the (k+1)-th surface.

When a lens surface is an aspheric surface, the radius of curvature (R) indicates the radius of curvature near the optical axis.

A negative value of the surface space indicates that the (k+1)-th surface is located on the light source side of the k-th surface.

TABLE 2

Aspheric surface coefficient (second surface)
Area up to a diameter of 3.30 mm centered at the optical axis

| | |
|---|---|
| A2 | $8.823128701 \times 10^{-3}$ |
| A3 | $5.137300397 \times 10^{-4}$ |
| A4 | $9.149331834 \times 10^{-5}$ |
| A5 | $-2.180800256 \times 10^{-5}$ |
| K | 0.000000000 |
| B | 0.000000000 |

Area outside of the diameter of 3.30 mm centered centered at the optical axis

| | |
|---|---|
| A2 | $8.823128701 \times 10^{-3}$ |
| A3 | $5.137300397 \times 10^{-4}$ |
| A4 | $9.149331834 \times 10^{-5}$ |
| A5 | $2.180800256 \times 10^{-5}$ |
| K | 0.000000000 |
| B | $4.371831356 \times 10^{-3}$ |

Aspheric surface coefficient (third surface)

| | |
|---|---|
| A2 | $2.404107962 \times 10^{-2}$ |
| A3 | $-6.667989083 \times 10^{-3}$ |
| A4 | $1.030167064 \times 10^{-3}$ |
| A5 | $-6.529123501 \times 10^{-5}$ |
| K | 0.000000000 |
| B | 0.000000000 |

TABLE 3

For DVD

| | |
|---|---|
| Wavelength in use | α = 650 nm |
| Disc thickness | 0.6 mm |
| Disc refractive index | N = 1.58 |
| Focal length | f = 3.050 mm |
| Stop diameter | φ = 3.66 mm |
| Numerical aperture | NA = 0.60 |
| Light source position | ∞ (incident light being a parallel luminous flux) |

For CD

| | |
|---|---|
| Wavelength in use | α = 780 nm |
| Disc thickness | 1.2 mm |
| Disc refractive index | N = 1.55 |
| Focal length | f = 3.069 mm |

TABLE 3-continued

| | |
|---|---|
| Stop diameter | φ =3.66 mm |
| Light source position | −51.78 mm |
| | (distance from the second surface to the light source) |

TABLE 4

| Sur-face | Radius of curvature (R) | Surface space (D) | | Refractive index (N) λ = | |
|---|---|---|---|---|---|
| | | λ = 650 nm | λ = 780 nm | λ = 650 nm | 780 nm |
| 1 | ∞ | −0.9000 | −0.9000 | 1.00000 | 1.00000 |
| 2 | 1.90071 | 2.1500 | 2.1500 | 1.52270 | 1.51921 |
| 3 | −6.04803 | 1.4860 | 1.3004 | 1.00000 | 1.00000 |
| 4 | ∞ | 0.6000 | 1.2000 | 1.58000 | 1.55000 |
| 5 | ∞ | | | | |

The first surface is the stop surface, the second and third surfaces are lens surfaces (both faces being aspheric surfaces), and the fourth and fifth surfaces are disc surfaces.

The surface space and refractive index shown in the k-th surface refer to the surface space and refractive index from in the area ranging from the k-th surface to the (k+1)-th surface.

When a lens surface is an aspheric surface, the radius of curvature (R) indicates the radius of curvature near the optical axis.

A negative value of the surface space indicates that the (k+1)-th surface is located on the light source side of the k-th surface.

TABLE 5

Aspheric surface coefficient (second surface)
Area up to a diameter of 3.30 mm centered at the optical axis

| | |
|---|---|
| A2 | 8.823128701 × 10$^{-3}$ |
| A3 | 5.137300397 × 10$^{-4}$ |
| A4 | 9.149331834 × 10$^{-5}$ |
| A5 | 2.180800256 × 10$^{-5}$ |
| K | 0.000000000 |
| B | 0.000000000 |

Area outside of the diameter of 3.30 mm centered at the optical axis

| | |
|---|---|
| A2 | 8.823128701 × 10$^{-3}$ |
| A3 | 5.137300397 × 10$^{-4}$ |
| A4 | 9.149331834 × 10$^{-5}$ |
| A5 | 2.180800256 × 10$^{-5}$ |
| K | 0.000000000 |
| B | 4.371831356 × 10$^{-3}$ |

Aspheric surface coefficient (third surface)

| | |
|---|---|
| A2 | 2.404107962 × 10$^{-2}$ |
| A3 | 6.667989083 × 10$^{-3}$ |
| A4 | 1.030167064 × 10$^{-3}$ |
| A5 | 6.529123501 × 10$^{-5}$ |
| K | 0.000000000 |
| B | 0.000000000 |

TABLE 6

For DVD

| | |
|---|---|
| Wavelength in use | α = 650 nm |
| Disc thickness | 0.6 mm |
| Disc refractive index | N = 1.58 |

TABLE 6-continued

| | |
|---|---|
| Focal length | f = 3.050 mm |
| Stop diameter | φ= 3.66 mm |
| Numerical aperture | NA = 0.60 |
| Light source position | ∞ (incident light being a parallel luminous flux) |

For CD

| | |
|---|---|
| Wavelength in use | α = 780 nm |
| Disc thickness | 1.2 mm |
| Disc refractive index | N = 1.55 |
| Focal length | f = 3.069 mm |
| Stop diameter | φ = 3.66 mm |
| Light source position | −51.78 mm |
| | (distance from the second surface to the light source) |

What is claimed is:

1. An objective lens for optical recording media, which, when recording or reproducing information for a first optical recording medium corresponding to a first numerical aperture and a first wavelength and a second optical recording medium corresponding to a second numerical aperture and a second wavelength, converges said wavelengths of light in use to respective desirable positions;

wherein one surface of said objective lens is provided with a zonal part which acts so as to apparently cancel the quantity of light having one wavelength $\lambda_1$ in an outer peripheral portion of a luminous flux thereof due to an interference effect but keep the quantity of light having the other wavelength $\lambda_2$ in said outer peripheral portion thereof;

wherein said zonal part has a step by which light supposed to pass a position corresponding to said zonal part if said zonal part does not exist and light passing a position at which said zonal part is formed if said zonal part exists generate therebetween a phase difference satisfying the following conditional expressions (1) and (2):

$$\Delta_{\lambda 1}=(2m+1)\lambda_1/2+\delta_1, \quad (1)$$

$$\Delta_{\lambda 2}=n\lambda_2+\delta_2 \quad (2)$$

where $\Delta_{\lambda 1}$ is the phase difference at the wavelength $\lambda_1$ between the light supposed to pass the position corresponding to said zonal part if said zonal part does not exist and the light passing the position at which said zonal part is formed if said zonal part exists;

$\Delta_{\lambda 2}$ is the phase difference at the wavelength $\lambda_2$ between the light supposed to pass the position corresponding to said zonal part if said zonal part does not exist and the light passing the position at which said zonal part is formed if said zonal part exists;

m and n are integers;

$|\delta_1|<0.2\ \lambda_1$; and $|\delta_2|<0.2\ \lambda_2$; and wherein the numerical aperture at a boundary position of said step has a value between said first and second numerical apertures.

2. An objective lens for optical recording media according to claim 1, wherein said zonal part is formed such that a center part of said objective lens surface is recessed with respect to the outer peripheral face thereof.

3. An objective lens for optical recording media according to claim 1, wherein said zonal part is formed such that a center part of said objective lens surface is protruded with respect to the outer peripheral face thereof.

4. An objective lens for optical recording media according to claim 1, wherein said wavelength $\lambda_1$ of light is light having a wavelength of 780 nm used for recording and reproducing CD-R; and wherein said wavelength $\lambda_2$ of light is light having a wavelength of 650 nm used for recording and reproducing DVD.

5. An optical pickup apparatus comprising the objective lens for optical recording media according to claim 1.

* * * * *

UNITED STATES PATENT AND TRADEMARK OFFICE
CERTIFICATE OF CORRECTION

| | |
|---|---|
| PATENT NO. | : 6,542,314 B2 |
| DATED | : April 1, 2003 |
| INVENTOR(S) | : Masato Kawabata and Toshiaki Katsuma |

It is certified that error appears in the above-identified patent and that said Letters Patent is hereby corrected as shown below:

Column 12,
Line 41, delete "$\Delta_{\lambda 1}=(2m+1) \lambda_1/2+\delta_1$." and substitute therefore -- $\Delta_{\lambda 1}= (2m+1) \lambda_1/2+\delta_1$ --

Signed and Sealed this

First Day of July, 2003

JAMES E. ROGAN
*Director of the United States Patent and Trademark Office*